United States Patent
Ko

(10) Patent No.: US 7,448,810 B2
(45) Date of Patent: Nov. 11, 2008

(54) DUSTPROOF TRANSCEIVER

(75) Inventor: Ming-Tsung Ko, Panchiao (TW)

(73) Assignee: Axcen Photonics Corp., Hsinflen, Taipei Hsien (TW)

( * ) Notice: Subject to any disclaimer, the term of this patent is extended or adjusted under 35 U.S.C. 154(b) by 168 days.

(21) Appl. No.: 11/460,535

(22) Filed: Jul. 27, 2006

(65) Prior Publication Data
US 2008/0031631 A1    Feb. 7, 2008

(51) Int. Cl.
*G02B 6/36* (2006.01)
(52) U.S. Cl. .............................. 385/92; 385/53; 385/76; 385/86; 385/88; 385/139; 398/135; 398/139; 455/90.3
(58) Field of Classification Search .................... 385/53, 385/76, 86–94, 139; 398/135, 139; 455/90.3
See application file for complete search history.

(56) References Cited

U.S. PATENT DOCUMENTS

| | | | |
|---|---|---|---|
| 6,744,963 B2 * | 6/2004 | Hwang | 385/139 |
| 7,003,230 B2 * | 2/2006 | Branch et al. | 398/135 |
| 7,306,381 B2 * | 12/2007 | Yu et al. | 385/92 |
| 7,322,753 B2 * | 1/2008 | Mizue et al. | 385/92 |
| 2006/0204200 A1 * | 9/2006 | Lampert et al. | 385/139 |
| 2007/0066248 A1 * | 3/2007 | Ka | 455/90.3 |

* cited by examiner

*Primary Examiner*—Sung Pak
*Assistant Examiner*—Daniel Petkovsek
(74) *Attorney, Agent, or Firm*—Pai Patent & Trademark Law Firm; Chao-Chang David Pai

(57) ABSTRACT

A dustproof transceiver includes a transceiver body, a first dustproof cover and a second dustproof cover. The transceiver body has an opening to receive an optical fiber connector. The first dustproof cover is pivotally connected on the transceiver body to swivel and shelter a part of the opening. The second dustproof cover slides on the transceiver body to shelter the remaining part of the opening. A spring is secured to the transceiver body at one end and secured to the second dustproof cover at an opposite end. A rebounding member has two spiral springs, two securing ends and a securing section linking the two spiral springs. The two securing ends are respectively coupled to the transceiver body and the securing section is coupled to the first dustproof cover such that the rebounding member exerts a force on the first dustproof cover to shelter the part of the opening.

13 Claims, 5 Drawing Sheets

DUSTPROOF TRANSCEIVER

BACKGROUND

1. Field of Invention

The present invention relates to an optoelectronic communication device. More particularly, the present invention relates to a transceiver.

2. Description of Related Art

As network technology grows rapidly, optoelectronic communication technology is becoming more popular because of its ability to transfer a large amount of data at high speeds. The optoelectronics industry develops applications that integrate electronics with optics. One of the critical components in optoelectronic communication is the optical transceiver module. The optical transceiver includes a receiver to transform a received optical signal into an electronic signal, and a transmitter to transform an electronic signal into an optical signal and transmit it.

A networking product such as a hub is typically equipped with a transceiver as described above. Contaminants such as dust tend to accumulate in a transceiver or its associated devices, so the transceiver can be easily contaminated and damaged if proper protection is not provided after the optical fiber is disconnected from the transciever. A conventional protection method is to employ a plug to close off the opening of the transceiver after disconnecting the optical fiber.

Nevertheless, protection by manual plugging after disconnection of an optical fiber often causes an inconvenience when information management staff or users operate or maintain the device, resulting in users forgetting or refusing to insert the plug or users losing the plug.

For the foregoing reasons, there is a need for an improved transceiver to avoid the problem stated above.

SUMMARY

It is therefore an objective of the present invention to provide a dustproof transceiver with an automatic dustproof function.

In accordance with the foregoing and other objectives of the present invention, a dustproof transceiver includes a transceiver body, a first dustproof cover and a second dustproof cover. The transceiver body has an opening to receive an optical fiber connector. The first dustproof cover is pivotally connected on the transceiver body to swivel to uncover or shelter a part of the opening. The second dustproof cover slides on the transceiver body to uncover or shelter the remaining part of the opening. A spring is secured to the transceiver body at one end and secured to the second dustproof cover at an opposite end so as to maintain the second dustproof cover to shelter the opening. A rebounding member has two spiral springs, two securing ends and a securing section linking the two spiral springs. The two securing ends are respectively coupled to the transceiver body and the securing section is coupled to the first dustproof cover such that the rebounding member exerts a force on the first dustproof cover to return to shelter the opening.

Thus, the dustproof transceiver initiates a dustproof function automatically and can be removed from a hub without removing a plugged optical fiber connector first.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
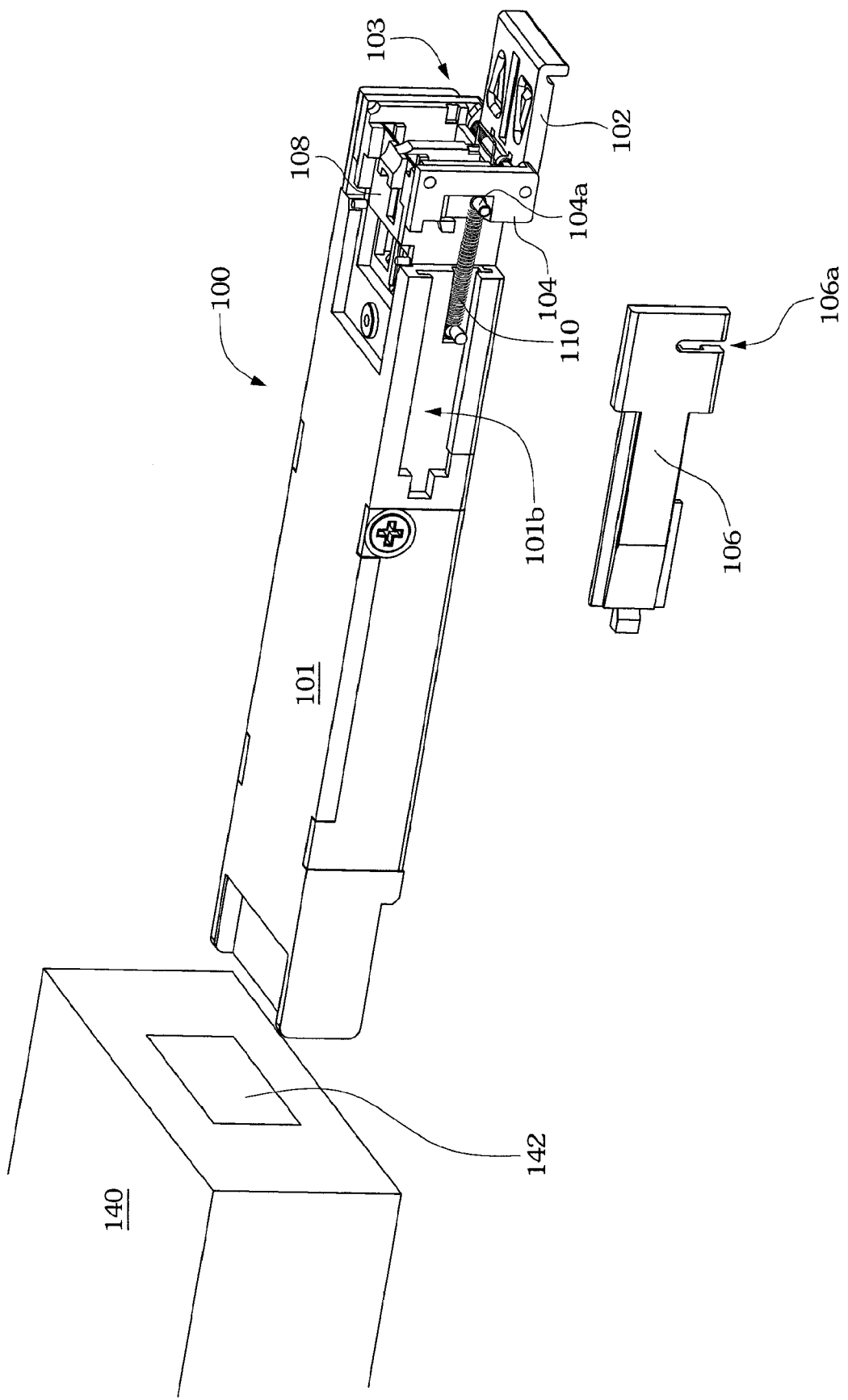
FIG. 1 illustrates a perspective view of a transceiver according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
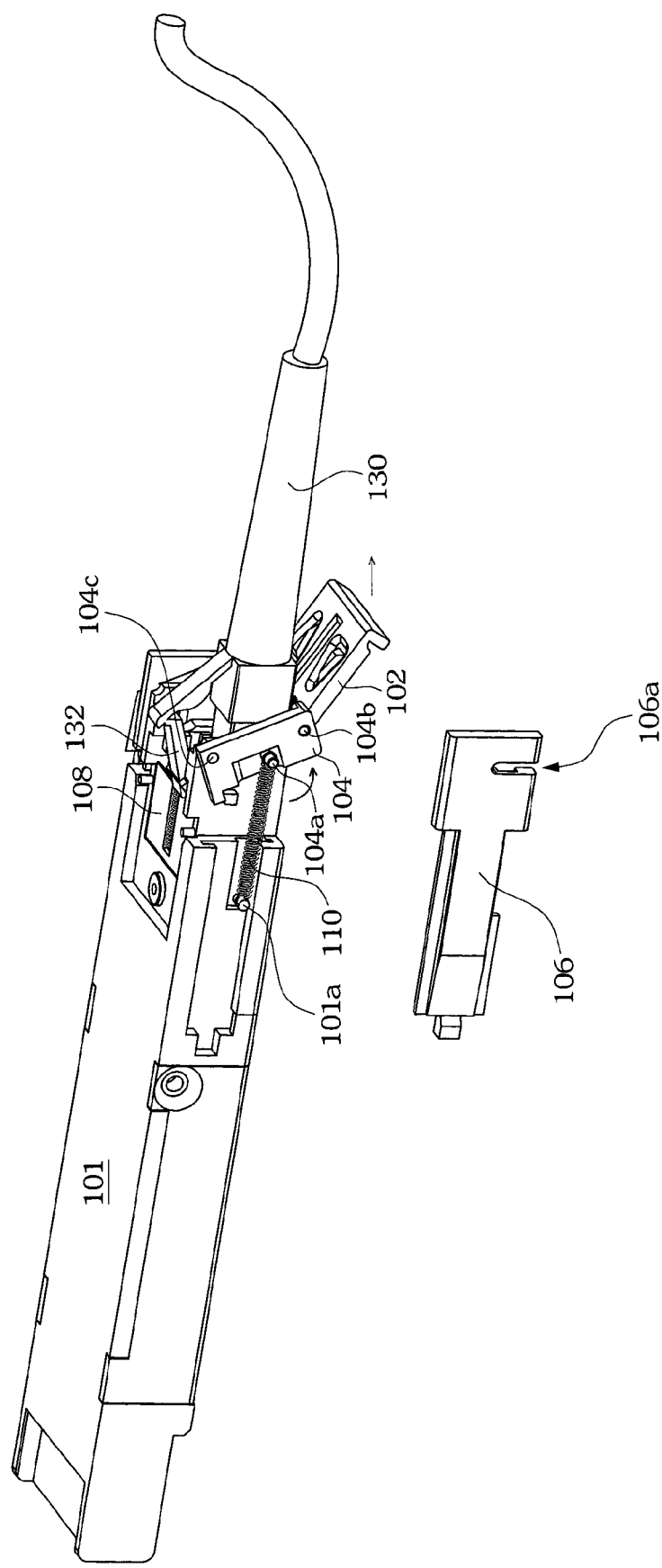
FIG. 2 illustrates a perspective view of an optical fiber connecting to the transceiver according to one preferred embodiment of this invention.

FIG. 1 illustrates a perspective view of a transceiver according to one preferred embodiment of this invention. FIG. 2 illustrates a perspective view of an optical fiber connecting to the transceiver according to one preferred embodiment of this invention.

A dustproof transceiver 100 includes a transceiver body 101, a dustproof cover 102 and a dustproof cover 108. The transceiver body 101 has a receiving opening 103 to connect with an optical fiber connector 130. The dustproof cover 102 is to shelter a side part of the opening 103 and the dustproof cover 108 is to shelter a top part of the opening 103. The dustproof cover 102 is pivotally connected to the transceiver body 101 such that the dustproof cover 102 can swivel to uncover or shelter the opening 103. The dustproof cover 108 can slide on the transceiver body 101 to uncover or shelter a remaining part of the opening 103 in response to the optical fiber connector 130 to plug in or unplug from the opening 103.

The transceiver body 101 has a release arm 104, which is pivotally connected with the transceiver body 101 by a pin 104c, to release the transceiver body 101 from the hub 140. Therefore, the transceiver body 101 can be removed from the hub when users pull the release arm 104. The dustproof cover 102 is pivotally connected with the release arm 104 by a pin 104b such that users can also pull the dustproof cover 102 to release the transceiver body 101 from the hub 140. Therefore, users can pull the dustproof cover 102 or the release arm 104 to release the transceiver body 101 without removing the optical fiber connector 130 first.

A fastening member 106 secures the transceiver body 101 to a receiving hole 142 of the hub 140. For clarity, the fastening member 106 in FIG. 1 has been removed from the transceiver body 101. The transceiver body 101 further comprises a concave section 101b to accommodate the fastening member 106 to slide along the concave section 101b. The release arm 104 has a pin 104a to fit into a pin slot 106a of the fastening member 106 such that the release arm 104 can carry the fastening member 106 to the right to release the transceiver body 101 from the hub 140 (as illustrated in FIG. 2).

A spring 110 is secured to a pin 101a of the transceiver body 101 at one end, and secured to the pin 104a of the release arm 104 at an opposite end. Therefore, the position of the release arm 104 can be maintained as illustrated in FIG. 1, and the position of the release arm 104 as illustrated in FIG. 2 can be automatically returned to the position in FIG. 1.

Before an optical fiber connector 130 is plugged into the transceiver body 101, the dustproof cover 102 is swiveled to uncover the opening 103. When the optical fiber connector 130 is plugged into the transceiver body 101, the sloping member 132 pushes the dustproof cover 108 backwards.

Figure 3:
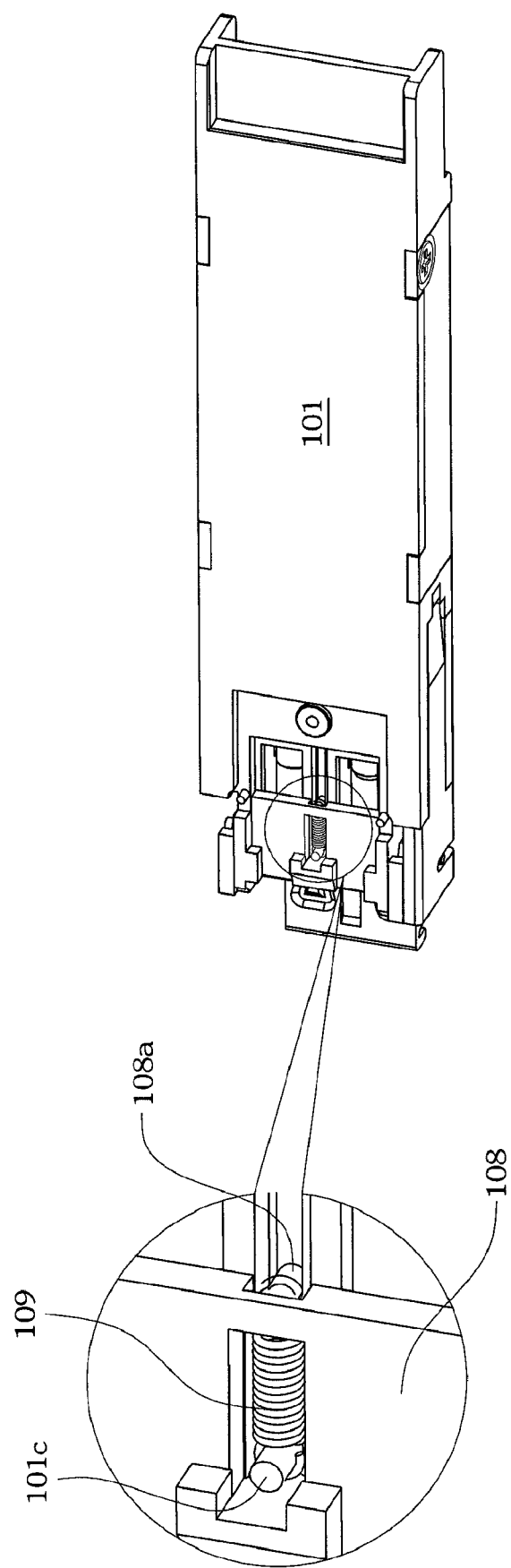
FIG. 3 illustrates a perspective view of a transceiver with an enlarged view of a dustproof cover according to one preferred embodiment of this invention.
Figure 4:
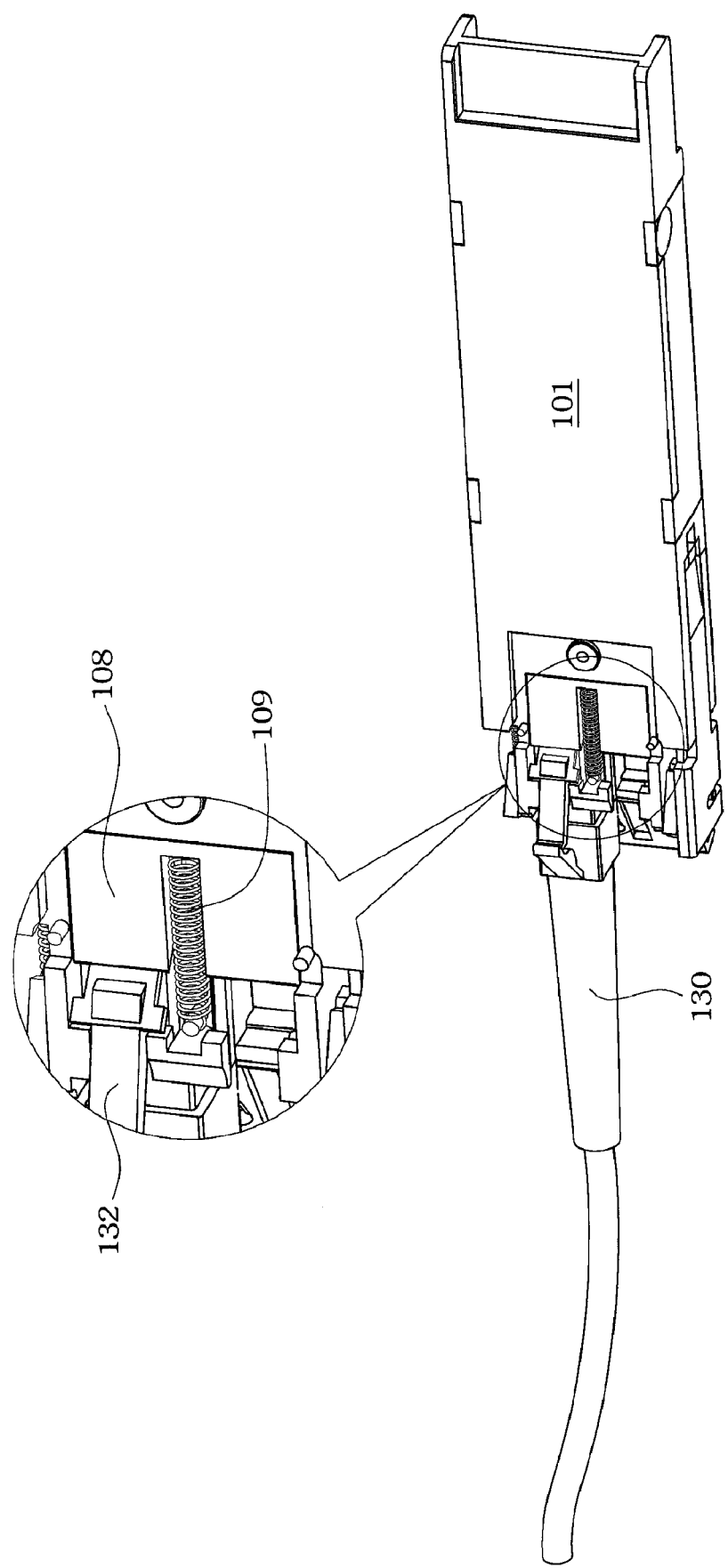
FIG. 4 illustrates a perspective view of a transceiver with an enlarged view of a dustproof cover (when the optical fiber connects to the transceiver) according to one preferred embodiment of this invention.

Referring to FIG. 3 and FIG. 4, two positions of the dustproof cover 108 are illustrated. A spring 109 is secured to a pin 101c of the transceiver body 101 at one end, and secured to the pin 108a of the dustproof cover 108 at an opposite end. When the optical fiber connector 130 is plugged into the transceiver body 101, the status of the dust cover 108 is maintained as in FIG. 4, where the sloping member 132 pushes the dust cover 108 and the spring 109 has been extended. When the optical fiber connector 130 is not plugged into the transceiver body 101, the status of the dust cover 108 is maintained as in FIG. 3 to shelter the receiving opening by means of the spring 109. Thus, the dust cover 108 provides an automatic dustproof function in response to the optical fiber connector 130 to plug in or unplug from the opening 103.

Figure 5:
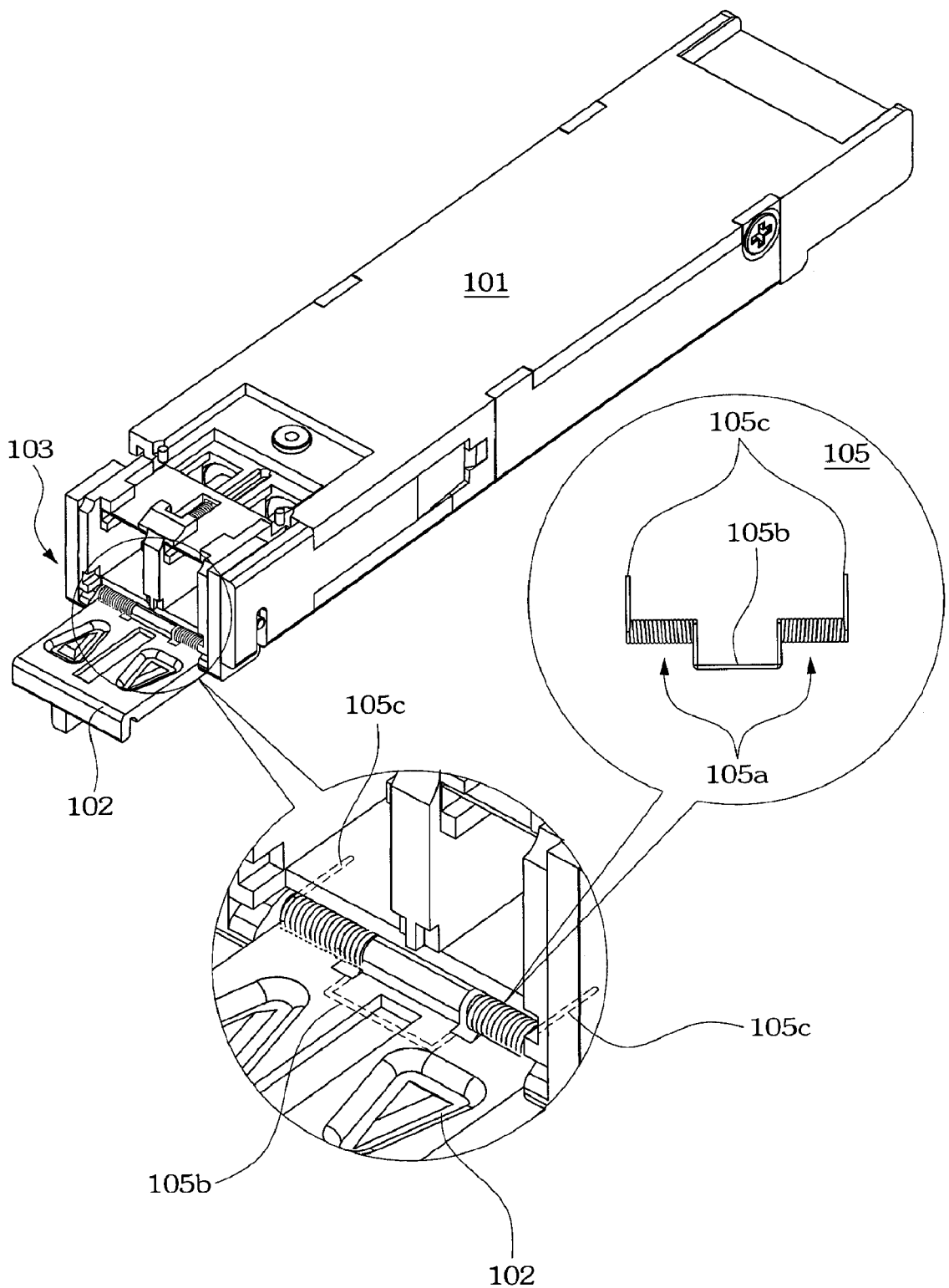
FIG. 5 illustrates a perspective view of a transceiver with an enlarged view of another dustproof cover according to one preferred embodiment of this invention.

FIG. 5 illustrates a perspective view of a transceiver with an enlarged view of another dustproof cover according to one preferred embodiment of this invention. The dustproof cover 102 also provides an automatic dustproof function. The automatic dustproof function is provided by a rebounding member 105. The rebounding member 105 has two spiral springs 105a, two securing ends 105c and a securing section 105b linking the two spiral springs 105a. The two securing ends 105c are coupled to the transceiver body 101 and the securing section 105b is coupled to the dustproof cover 102 such that the rebounding member 105 exerts a force on the dustproof cover 102 to return to shelter the opening 103.

According to preferred embodiments of the present invention, the dustproof transceiver initiates a dustproof function automatically and can be removed from a hub without removing a plugged optical fiber connector first.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transceiver, comprising:
  a transceiver body having an opening to receive an optical fiber connector;
  a cover, pivotally connected on the transceiver body, wherein the cover swivels to uncover or shelter the opening; and
  a rebounding member having two spiral springs, two securing ends and a securing section linking the two spiral springs, wherein the two securing ends are coupled to the transceiver body and the securing section is coupled to the cover such that the rebounding member exerts a force on the cover to return to shelter the opening.

2. The transceiver of claim 1, further comprising:
  a fastening member, sliding on the transceiver body; and
  a releasing arm, pivotally connected with the transceiver body and coupled to the fastening member to carry the fastening member to release the transceiver body from a hub, wherein the cover is pivotally connected with the releasing arm such that the cover swivels to uncover or shelter the opening.

3. The transceiver of claim 2, wherein the transceiver body further comprises a concave section to accommodate the fastening member to slide thereof.

4. The transceiver of claim 2, further comprising a spring secured to the transceiver body at one end and secured to the releasing arm at an opposite end.

5. The transceiver of claim 2, wherein the fastening member has a pin slot and the releasing arm has a pin to fit into the pin slot such that the releasing arm carries the fastening member.

6. A transceiver, comprising:
  a transceiver body with an opening to receive an optical fiber connector;
  a first cover, pivotally connected on the transceiver body to swivel to uncover or shelter a part of the opening;
  a second cover, sliding on the transceiver body to uncover or shelter a remaining part of the opening; and
  a rebounding member, being coupled to the transceiver body and the first cover so as to exerts force on the first cover to return to shelter the part of the opening.

7. The transceiver of claim 6, further comprising a spring secured to the transceiver body at one end and secured to the second cover at an opposite end so as to maintain the second cover to shelter the remaining part of the opening.

8. The transceiver of claim 6, further comprising:
  a fastening member, sliding on the transceiver body; and
  a releasing arm, pivotally connected with the transceiver body and coupled to the fastening member to carry the fastening member to release the transceiver body from a hub, wherein the first cover is pivotally connected with the releasing arm such that the first cover swivels to uncover or shelter the part of opening.

9. The transceiver of claim 8, wherein the transceiver body further comprises a concave section to accommodate the fastening member to slide thereof.

10. The transceiver of claim 8, further comprising a spring secured to the transceiver body at one end and secured to the releasing arm at an opposite end.

11. The transceiver of claim 8, wherein the fastening member has a pin slot and the releasing arm has a pin to fit into the pin slot such that the releasing arm carries the fastening member.

12. A transceiver, comprising:
  a transceiver body having an opening to receive an optical fiber connector;
  a fastening member, being slidably connected with the transceiver body along a first direction, wherein the fastening member has a pin slot extending along a second direction perpendicular to the first direction;
  a releasing arm, being pivotally connected with the transceiver body at one end and having a pin engaging within the pin slot of the fastening member to carry the fastening member to slide along the first direction to release the transceiver body from a hub; and
  a spring secured to the transceiver body at one end and secured to the pin of the releasing arm at an opposite end.

13. The transceiver of claim 12, wherein the transceiver body further comprises a concave section to accommodate the fastening member to be slid within.

* * * * *